US012776325B2

(12) United States Patent
Ragot et al.

(10) Patent No.: US 12,776,325 B2
(45) Date of Patent: Oct. 27, 2026

(54) SPATIALIZED AUDIO ENCODING WITH CONFIGURATION OF A DECORRELATION PROCESSING OPERATION

(71) Applicant: ORANGE, Issy-les-Moulineaux (FR)

(72) Inventors: Stéphane Ragot, Chatillon (FR); Arnaud Lefort, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 147 days.

(21) Appl. No.: 18/867,639

(22) PCT Filed: May 30, 2023

(86) PCT No.: PCT/EP2023/064457
§ 371 (c)(1),
(2) Date: Nov. 20, 2024

(87) PCT Pub. No.: WO2023/232823
PCT Pub. Date: Dec. 7, 2023

(65) Prior Publication Data

US 2025/0329335 A1 Oct. 23, 2025

(30) Foreign Application Priority Data

May 30, 2022 (FR) ....................................... 2205172

(51) Int. Cl.
*G10L 19/008* (2013.01)
*G10L 19/032* (2013.01)
*H04S 7/00* (2006.01)

(52) U.S. Cl.
CPC .......... *G10L 19/008* (2013.01); *G10L 19/032* (2013.01); *H04S 7/00* (2013.01); *H04S 2420/11* (2013.01)

(58) Field of Classification Search
CPC ....... G10L 19/008; G10L 19/032; H04S 7/00; H04S 2420/11
See application file for complete search history.

(56) References Cited

U.S. PATENT DOCUMENTS

| | | | | |
|---|---|---|---|---|
| 8,238,561 B2* | 8/2012 | Jung | G10L 19/008 | 381/23 |
| 2016/0189723 A1* | 6/2016 | Davis | G10L 19/018 | 704/501 |
| 2020/0105282 A1* | 4/2020 | Kim | G10L 19/008 | |

FOREIGN PATENT DOCUMENTS

| | | | |
|---|---|---|---|
| AU | 2015330759 | A1 | 3/2017 |
| WO | 2016057926 | A1 | 4/2016 |

OTHER PUBLICATIONS

A. Politis, L. McCormack and V. Pulkki, "Enhancement of ambisonic binaural reproduction using directional audio coding with optimal adaptive mixing," 2017 IEEE Workshop on Applications of Signal Processing to Audio and Acoustics (WASPAA), New Paltz, NY, USA, 2017, pp. 379-383 (Year: 2017).*

(Continued)

*Primary Examiner* — Daniel C Washburn
*Assistant Examiner* — Penny L Caudle
(74) *Attorney, Agent, or Firm* — David D. Brush; Westman, Champlin & Koehler, P.A.

(57) ABSTRACT

A method for encoding audio signals forming in time a succession of frames of samples, in each of n channels of an ambisonic representation of order higher than 0. The method includes: determining, for the current frame to be encoded, the binary value indicating an active or inactive mode of a decorrelation processing operation to be applied to the signals of the current frame and encoding this value into the bitstream; in the case where the mode is determined to be active, encoding into the bitstream decorrelation-processing information; generating an output signal to be encoded into the bitstream, depending on the mode determined for the current frame and the mode determined for the preceding frame. A corresponding decoding method is provided, as well as encoding and decoding devices implementing the respective encoding and decoding methods.

12 Claims, 3 Drawing Sheets

(56) References Cited

OTHER PUBLICATIONS

English translation of the Written Opinion of the International Searching Authority dated Aug. 28, 2023 for corresponding International Application No. PCT/EP2023/064457, filed May 30, 2023.
International Search Report dated Aug. 28, 2023 for corresponding International Application No. PCT/EP2023/064457, filed May 30, 2023.
Written Opinion of the International Searching Authority dated Aug. 28, 2023 for corresponding International Application No. PCT/EP2023/064457, filed May 30, 2023.
V. Pulkki, "Spatial sound reproduction with directional audio encoding," Journal of the Audio Engineering Society, vol. 55, No. 6, pp. 503-516, Jun. 2007.
P. Mahé et al., "First-order ambisonic coding with quaternion-based interpolation of PCA rotation matrices," EAA Spatial Audio Signal Processing Symposium, Sep. 2019, Paris, France.
P. Mahé et al., "First-Order Ambisonic coding with PCA Matrixing and Quaternion-Based Interpolation," Proceedings of the 22nd International Conference on Digital Audio Effects (DAFx-19), Birmingham, UK, Sep. 2-6, 2019.

* cited by examiner

SPATIALIZED AUDIO ENCODING WITH CONFIGURATION OF A DECORRELATION PROCESSING OPERATION

CROSS-REFERENCE TO RELATED APPLICATIONS

This application is a Section 371 National Stage Application of International Application No. PCT/EP2023/064457, filed May 30, 2023, and published as WO 2023/232823 on Dec. 7, 2023, not in English, which claims priority to French Patent Application FR2205172, filed May 30, 2022, the contents of which are incorporated herein by reference in their entireties.

FIELD OF THE DISCLOSURE

The present invention relates to the encoding/decoding of spatialized sound data, notably in an ambiophonic context (also denoted as "ambisonic" hereinafter).

BACKGROUND OF THE DISCLOSURE

The encoders/decoders (hereinafter called "codecs") which are currently used in mobile telephony are mono (a single signal channel for a rendering on a single loudspeaker). The codec 3GPP EVS (for "Enhanced Voice Services") allows a "Super-HD" (also referred to as "High Definition Plus" or HD+ voice) quality to be offered with a SWB (for "super-wideband") audio band for signals sampled at 32 or 48 KHz or FB (for "Fullband") for signals sampled at 48 KHz; the audio bandwidth is from 14.4 to 16 kHz in SWB mode (from 9.6 to 128 kbit/s) and from 20 KHz in FB mode (from 16.4 to 128 kbit/s).

The next development in quality of the conversational services offered by the operators should consist of immersive services, using terminals such as smartphones equipped with several microphones, or of spatialized audio conference or visioconference equipment of the telepresence or 360° video type, or else "live" audio content sharing equipment with a 3D spatialized sound rendering much more immersive than a simple 2D stereo rendering. With the increasingly widespread use of audio headsets on mobile telephones and the appearance of advanced audio equipment (accessories such as a 3D microphone, voice assistants with acoustic antennas, virtual reality headsets, etc.), the capturing and the rendering of spatialized sound scenes are now sufficiently common in order to offer an immersive communication experience.

In this respect, the future standard 3GPP "IVAS" (for "Immersive Voice and Audio Services") includes the extension of the codec EVS to the immersive by accepting as input format of the codec at least the spatialized sound formats listed hereinbelow (and their combinations):

- Channel-based format of the stereo or 5.1 type, where each channel supplies a loudspeaker (for example L and R in stereo, or L, R, Ls, Rs and C in 5.1);
- Object-based format, where sound objects are described as an audio signal (generally mono) associated with metadata describing the attributes of this object (position in space, spatial width of the source, etc.),
- Scene-based format which describes the sound field at a given point, in general captured by a spherical microphone or synthetized in the spherical harmonic domain.

The emphasis hereinafter is typically the encoding of a sound in the scene-based (or ambisonic) format, by way of exemplary embodiment (where at least certain aspects presented in relation to the invention hereinafter may also be applied to formats other than the scene-based format).

Ambisonics is a method of recording ("encoding" in the acoustic sense) spatialized sound and of reproduction ("decoding" in the acoustic sense). An ambisonic microphone (of order 1) comprises at least four capsules (typically of the cardioid or sub-cardioid type) arranged on a spherical grid, for example the apices of a regular tetrahedron. The audio channels associated with these capsules are called the "A-format". This format is converted into a "B-format", in which the sound field is decomposed into four components (spherical harmonics) denoted W, X, Y, Z, which correspond to four coincident virtual microphones. The component W corresponds to an omnidirectional capturing of the sound field whereas the components X, Y and Z, more directive, may be considered as pressure-gradient microphones oriented along the three spatial orthogonal axes. An ambisonic system is a flexible system in the sense that the recording and the rendering are separated and decoupled. It allows a decoding (in the acoustic sense) on any given configuration of loudspeakers (for example, binaural, "surround" sound of the 5.1 type or periphonic (with elevation) of the 7.1.4 type). The ambisonic approach may be generalized to more than four channels in B-format and this generalized representation is commonly called "HOA" (for "Higher-Order Ambisonics"). Decomposing the sound over more spherical harmonics improves the spatial precision when rendering onto loudspeakers.

An ambisonic signal of order M comprises $K=(M+1)^2$ components and, at the order 1 (if M=1), the four components, W, X, Y, and Z, are recovered, which is commonly called FOA (for First-Order Ambisonics). There also exists a variant, referred to as "planar", of the ambisonic (W, X, Y) which decomposes the sound defined in a plane which is generally the horizontal plane. In this case, the number of components is K=2M+1 channels. The ambisonic of order 1 (4 channels: W, X, Y, Z), the planar ambisonic of order 1 (3 channels: W, X, Y), the ambisonic of higher order are all irrespectively denoted hereinafter by "ambisonic" for ease of reading, the processing operations presented being applicable irrespective of the type, planar or otherwise, and of the number of ambisonic components.

In the following, "ambisonic signal" will refer to a signal in B-format of a predetermined order with a certain number of ambisonic components. This also comprises the hybrid cases, where for example, at the order 2, there are only 8 channels (instead of 9)—more precisely, at the order 2, there are the 4 channels of the order 1 (W, X, Y, Z) to which 5 channels (usually denoted R, S, T, U, V) are normally added, and one of the channels of higher order (for example R) may for example be ignored. This also comprises the case where an ambisonic signal has undergone pre-processing in order to transform it into pre-processed channels prior to encoding.

The signals to be processed by the encoder/decoder take the form of successions of blocks of sound samples called "frames" or "sub-frames" hereinafter.

Furthermore, hereinafter, the mathematical notations follow the following convention:

- Scalar: s or N (lower case for the variables or upper case for the constants)
- the operator Re(·) denotes the real part of a complex number
- Vector: u (lower case, bold)
- Matrice: A (upper case, bold)

The notations $A^T$ and $A^H$ respectively indicate the transposition and the Hermitian transposition (transpose and conjugate) of A.

A one-dimensional signal with discrete time, s(i), defined over a time interval i=0, . . . , L−1 of length L is represented by a row vector $$s=[s(0),\ \ldots\ ,s(L-1)]$$

This could also be written: $s=[s_0, \ldots, s_{L-1}]$ in order to avoid the use of the parentheses.

A multi-dimensional signal with discrete time, b(i), defined over a time interval i=0, . . . , L−1 of length L and with K dimensions is represented by a matrix of size L×K:

$$B=\begin{bmatrix} b_0(0) & \ldots & b_0(L-1) \\ \vdots & \ldots & \vdots \\ b_{K-1}(0) & \ldots & b_{K-1}(L-1) \end{bmatrix}.$$

This could also be written: $B=[B_{ij}]$, i=0, . . . K−1, j=0 . . . L−1, in order to avoid the use of the parentheses.

Furthermore, the known conventions of the prior art in ambisonics relating to the order of the ambisonic components (including ACN for "Ambisonic Channel Number", SID for "Single Index Designation", FuMA for "Furse-Malham") and the normalization of the ambisonic components (SN3D, N3D, maxN) are not recalled here. Further details may be found for example in the resource available on line: https://en.wikipedia.org/wiki/Ambisonic data exchange formats By convention, the first component of an ambisonic signal corresponds in general to the omnidirectional component W.

The simplest approach for encoding an ambisonic signal consists in using a mono encoder and in applying it separately to each of the individual channels potentially with an allocation of the different bits according to the channels. This approach here is called "multi-mono". The multi-mono approach may be extended to multi-stereo encoding (where pairs of channels are encoded separately by a stereo codec) or, more generally, to the use of several parallel instances of the same core codec. The input signal is divided into channels (one mono channel or several channels). These channels are encoded separately depending on a predetermined distribution and binary allocation. At the decoding, the decoded channels are recombined according to the convention of the input signal.

The quality of the multi-mono or multi-stereo encoding varies depending on the core encoding and decoding used, and it is generally only satisfactory at very high rates. For example, in the multi-mono case, the EVS encoding may be judged to be quasi-transparent (from a perceptual point of view) at a rate of at least 48 kbit/s per channel (mono); thus, for an ambisonic signal of order 1, a minimum rate of 4×48=192 kbit/s. Since the multi-mono encoding approach does not take into account the correlation between channels, it produces spatial deformations with the addition of various artifacts such as the appearance of phantom sound sources, of diffuse noise or of displacements of the paths of sound sources. Thus, the encoding of an ambisonic signal according to this approach leads to degradations of the spatialization.

An alternative approach to the separate encoding of the channels is given by parametric encoding such as the DIRAC encoding described for example in the article V. Pulkki, Spatial sound reproduction with directional audio encoding, Journal of the Audio Engineering Society, vol. 55, no. 6, pp. 503-516, 2007. In this document, a directional analysis of the ambisonic signal is carried out by frame and sub-bands for determining source directions (DoA). The DoA are completed by "diffuseness" parameters, which gives a parametric description of the sound scene. The multichannel input signal is encoded in the form of downmix channels (typically a mono or stereo signal obtained by reduction of multiple captured channels) and spatial metadata (DoA and "diffuseness" by sub-bands).

The invention also relates to another particular ambisonic encoding approach, described in the following publications:

P. Mahé, S. Ragot, S. Marchand, "First-order ambisonic encoding with quaternion-based interpolation of PCA rotation matrices," Proc. EAA Spatial Audio Signal Processing Symposium, Paris, France, September 2019, pp. 7-12

P. Mahé, S. Ragot, S. Marchand, "First-Order Ambisonic encoding with PCA Matrixing and Quaternion-Based Interpolation," Proc. DAFx, Birmingham, UK, September 2019.

This approach, in the following called encoding by principal component analysis, or simply PCA encoding, uses the quantization and the interpolation of rotation matrices associated with the eigenvectors of a PCA analysis, such as also described in the patent application WO2020177981. The strategy of this type of ambisonic encoding is to decorrelate the channels of the ambisonic signal and to subsequently encode the transformed channels separately with a core (for example multi-mono) codec. This strategy allows the spatial artifacts in the decoded ambisonic signal to be limited.

In this approach, for an ambisonic signal of order 1, rotation matrices of size 4×4 in 3D (coming from a PCA/KLT analysis such as described for example in the aforementioned patent application) are converted into parameters, for example 6 generalized Euler angles or two unitary quaternions, which are encoded.

With no loss of generality, the domain of the quaternions is more particularly retained here which allows the transformation matrices calculated for the PCA/KLT analysis to be efficiently interpolated; since the transformation matrices are rotation matrices, at the decoding, the inverse matrixing operation is carried out simply by transposing the matrix applied at the encoding.

FIG. 1 illustrates this method of encoding in the case where the representation by quaternions is used for both the encoding and the interpolation of the rotation matrices. The encoding takes place in several steps.

The original multichannel signal A of dimensions K×L (i.e. K components of L time or frequency samples) is at the input. In the block 100, a PCA analysis is carried out divided into several steps:

The signals of the channels (for example W, Y, Z, X for the FOA case) are assumed to take the form of a matrix A with an n×L matrix (for n ambisonic channels (here 4) and L samples per frame). These channels may optionally be pre-processed for example by a high-pass filter.

A covariance matrix of the multichannel signal A is obtained, for example as follows:

$C=A\cdot A^T$ to within a normalization factor (in the real case) or $C=\mathrm{Re}(A \cdot A^H)$ to within a normalization factor (in the complex case)

Operations for time smoothing of the covariance matrix may be used. In the case of a multichannel signal in the time domain, the covariance may be estimated in a recursive manner (sample by sample). The frame may also be divided into sub-frames and one covariance matrix be determined per sub-frame which is subsequently smoothed.

The diagonal elements of C are in particular noted in the form $C_{ii}$, which represents the energy $$\sigma_i^2$$

of the $i^{th}$ input channel of the PCA processing.

- A principal component analysis PCA is applied or, in an equivalent manner, a Karhunen-Loeve transform (KLT), with a decomposition into eigenvalues of the covariance matrix C, in order to obtain eigenvalues $\Lambda$ and a matrix of eigenvectors U such that $C=U\Lambda U^T$.
- The initial matrix of eigenvalues U, obtained for the current frame t, undergoes signed permutations so that it is the most aligned possible with the matrix of the same nature V of the preceding frame t−1, in order to ensure a maximum coherence between the transformation matrices between two frames. It is furthermore ensured that the matrix of eigenvalues of the current frame t, thus corrected by signed permutations, indeed represents the application of a rotation.

In the block 110, the new matrix of eigenvalues V for the current frame t (which is a rotation matrix) is converted into an appropriate domain of quantization parameters. The corresponding matrix of eigenvalues here is denoted $\Lambda=\mathrm{diag}(\lambda_1, \ldots, \lambda_n)$. Here, the case is considered of a conversion into 2 unitary quaternions for a 4×4 matrix; there would be a single unitary quaternion for a 3×3 matrix in the planar ambisonic case.

With a dimension of 4 (n=4), a rotation matrix V may be parametrized by the product of two unitary quaternions $q_1$ and $q_2$ in the matrix form:

$$V = q_1 q_2 = Q_1 \begin{pmatrix} a_2 \\ b_2 \\ c_2 \\ d_2 \end{pmatrix} = Q_2^* \begin{pmatrix} a_1 \\ b_1 \\ c_1 \\ d_1 \end{pmatrix}$$

where the quaternions are $q_1=a_1+b_1i+c_1j+d_1k$ and $q_2=a_2+b_2i+c_2j+d_2k$, with, for example:

$$Q = \begin{pmatrix} a_1 & -b_1 & -c_1 & -d_1 \\ b_1 & a_1 & -d_1 & c_1 \\ c_1 & d_1 & a_1 & -b_1 \\ d & -c_1 & b_1 & a_1 \end{pmatrix}$$

and $$Q_2^* = \begin{pmatrix} a_2 & -b_2 & -c_2 & -d_2 \\ b_2 & a_2 & d_2 & -c_2 \\ c_2 & -d_2 & a_2 & b_2 \\ d_2 & c_2 & -b_2 & a_2 \end{pmatrix}$$

Conversely, given a 4×4 rotation matrix, it is possible to find an associated double quaternion $(q_1, q_2)$ and the corresponding matrices. In other words, this matrix may be factorized into a product of matrices in the form $$Q_1 Q_2^*,$$

for example with the method known as "Cayley factorization". This generally involves calculating an intermediate matrix called "associated matrix" (or "tetragonal transform") and deducing the quaternions from this albeit with an uncertainty on the sign of the two quaternions.

These parameters $q_1$, $q_2$ are encoded according to an encoding method of the prior art (block 120) over a number of bits allocated to the quantization of parameters. For example, 19 bits could be used for $q_1$ and 18 bits for $q_2$, which gives a budget of $N_Q=37$ bits per frame.

The current frame is divided up into sub-frames, here the number of which is assumed to be fixed.

The representation by encoded quaternions is interpolated (block 130) by successive sub-frames of index t' from the end of the preceding frame t−1 up to the end of the current frame t, in order to smooth over time the difference between inter-frame matrixing. The quaternions interpolated within each sub-frame are converted into rotation matrices $\hat{V}(t')$ (block 140) then the resulting rotation matrices, decoded and interpolated within each sub-frame (block 150), are applied.

At the output of the block 150, a matrix is obtained representing each of the sub-frames of the signals of the ambisonic channels for decorrelating these signals and obtaining the transformed signal B. A binary allocation to the separate channels is also carried out (block 160) based on the overall number of bits from which the $N_Q$ bits used in the block 120 are subtracted.

FIG. 2 illustrates the corresponding decoding. The quantization indices of the quantization parameters of the rotation matrix in the current frame are de-multiplexed (block 200) and decoded in the block 230 according to a decoding method corresponding to the encoding (block 120). The transformed channels are also decoded (block 220), based on the binary allocation (block 210) identical to the encoder (block 160).

The conversion and interpolation steps (blocks 240, 250) of the decoder are identical to those carried out at the encoder (blocks 130 and 140).

The block 260 applies, by sub-frame, the inverse matrixing coming from the block 250 to the decoded signals of the ambisonic channels, recalling that the inverse of a rotation matrix is its transpose. It will be noted that the algorithmic delay linked to the encoding-decoding (blocks 170 and 220) must be compensated by storing in an appropriate manner in memory the inverse matrixing values.

The ambisonic encoding such as implemented in FIGS. 1 and 2 assumes that the input channels are (sufficiently) correlated. In particular, it assumes that the decorrelation by the block 150 provides an encoding gain; moreover, it assumes that the matrixing is stable from one frame to another so as not to generate audio artifacts in the transformed signal B. It is also noted that the encoding of the metadata (block 120) uses a rate typically of the order of 2 kbit/s (for example 1.85 kbit/s when $N_Q=37$ bits per frame of 20 ms) which is taken from the encoding budget of the channels (blocks 160 and 170).

However, for some signals such as recordings of applause where the sound field is relatively diffuse, the decorrelation gain may be low. For spatially unstable signals, for example percussive sounds whose localization alternates rapidly at each frame in the sound space, the PCA analysis (block 100) may lead to a very large variation of the matrixing by $\hat{V}$. In these two cases, a constant use of metadata for representing the PCA transformation does not turn out to be very relevant.

SUMMARY

An exemplary embodiment of the present invention will improve this situation.

For this purpose, it provides a method for encoding audio signals forming a succession of frames (t−1, t) of samples over time, within each of n channels in an ambisonic representation of order higher than 0, the method comprising:

- determine, for the current frame to be encoded, a binary value indicating an active mode (ON) or inactive mode (OFF) of a decorrelation processing to be applied to the signals of the current frame and encode this value into the bit-stream;
- in the case where the mode is determined as active, encode decorrelation processing information into the bit-stream;
- generate an output signal to be encoded into the bit-stream, according to the mode determined for the current frame and that of the preceding frame.

Thus, the present invention allows the use of a decorrelation between the n channels to be adapted as a function of the characteristics of the input signal.

In one embodiment, the determination of the binary value indicating an active or inactive mode is carried out according to at least one gain criterion for encoding signals before and after decorrelation processing.

This criterion thus allows it to be ensured that the decorrelation processing provides a sufficient gain in order to be activated.

According to one particular embodiment, the encoding gain is defined by the following logarithmic value:

$$G = \sum_{i=0}^{n-1} \log(\sigma_i^2 + \varepsilon) - \sum_{i=0}^{n-1} \log(\lambda_i + \varepsilon)$$

with $$\sigma_i^2$$

the energies of the input channels of the decorrelation processing and $\lambda_i$ the eigenvalues of the input channels, the mode being determined as inactive for a predefined value of the gain G.

In one embodiment, the determination of the binary value indicating an active or inactive mode is carried out according to a criterion of inter-frame distance between rotation matrices applying the decorrelation processing.

Thus, depending on the value of this distance, the generation of the signal to be encoded is adapted to avoid too large variations of the transformation matrix applying the decorrelation processing.

According to one particular embodiment, in which the rotation matrices are represented as a double quaternion, the inter-frame distance between rotation matrices is expressed using a scalar product between the quaternions at the current frame and those of the preceding frame. In one embodiment, the determination of the binary value indicating an active or inactive mode is carried out according to a criterion of distance between a rotation matrix, applying the decorrelation processing, of the current frame and the identity matrix.

Thus, here again, depending on the value of this distance, the generation of the signal to be encoded is adapted to avoid too large variations of the transformation matrix applying the decorrelation processing with respect to a direct encoding of the input.

In one particular embodiment, in which the rotation matrices are represented as a double quaternion, the distance between the rotation matrix of the current frame and the identity matrix is expressed in the form of a scalar product between the quaternions at the current frame and unitary quaternions.

The invention is applicable to a method for decoding audio signals forming a succession of frames (t−1, t) of samples over time, in each of n channels as an ambisonic representation of order higher than 0, the method comprising:

- receive, for a current frame (t), in addition to the signals of the n channels of this current frame, a binary value indicating an active or inactive mode of a decorrelation processing applied to the signals of the current frame;
- in the case where the mode is determined as active, decode the decorrelation processing information received in the bit-stream;
- generate an output signal, as a function of said mode determined for the current frame and that of the preceding frame.

The decoding method has the same advantages as the corresponding encoding method.

The present invention is also aimed at an encoding device comprising a processing circuit for the implementation of the encoding method previously presented.

It is also aimed at a decoding device comprising a processing circuit for the implementation of the aforementioned decoding method.

It is also aimed at a computer program comprising instructions for the implementation of the aforementioned method, when these instructions are executed by a processor of a processing circuit.

It is also aimed at a non-volatile memory medium storing the instructions of such a computer program.

BRIEF DESCRIPTION OF THE DRAWINGS

Other advantages and features and features of the invention will become apparent upon reading exemplary embodiments presented in the detailed description hereinafter and upon examining the appended drawings, in which.

DETAILED DESCRIPTION OF ILLUSTRATIVE EMBODIMENTS

With no loss of generality, the input signal is assumed to be an ambisonic signal of order 1 FOA in the ACN format and according to the SN3D normalization. In variants, the input signal could have been subjected to pre-processing operations, so as to obtain 4 channels derived from an original ambisonic signal (FOA).

Figure 3:
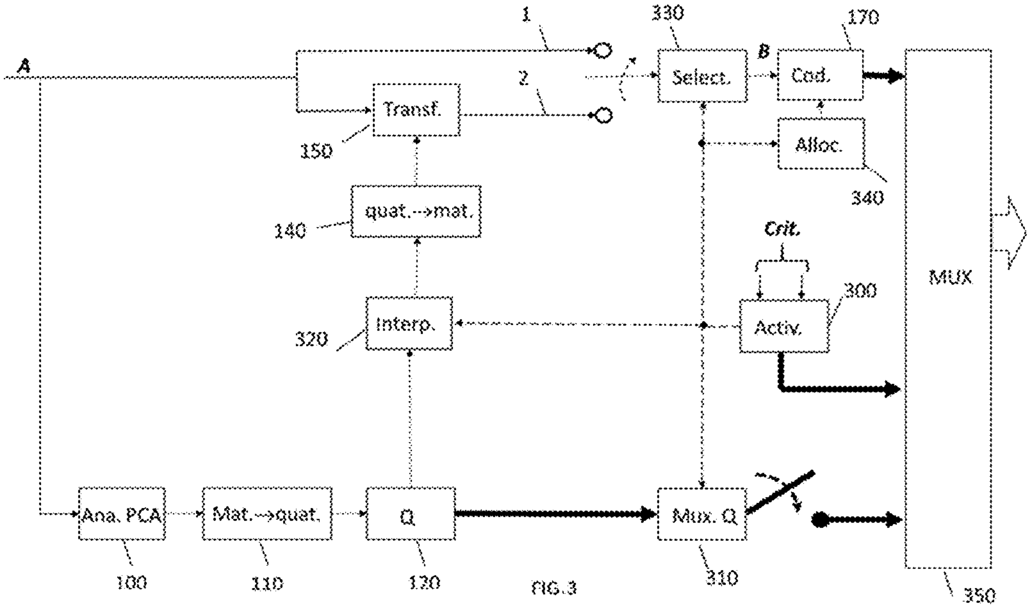
FIG. 3 illustrates one embodiment of an encoder and of an encoding method according to one embodiment of the invention.

FIG. 3 illustrates an encoding method according to the invention where the decorrelation by PCA is applied in an adaptive manner (PCA active or inactive) within each frame here assumed to be of length 20 ms (for example L=960 samples at 48 KHz). It is assumed that R bits are allocated to the current frame for the encoding, for example at 256 kbit/s, R=5120 bits. In variants, this budget R could be reduced as a function of bits already used by potential pre-processing operations on the signal prior to encoding by PCA.

The adaptation decision is given by the block 300 which determines the value of an indication of activation or otherwise of a decorrelation processing (PCA) to be applied to the current frame, this indication corresponds to mode=ON (PCA active or activated) or OFF (PCA inactive or disabled). The decision criteria will be described hereinbelow.

Thus, a binary value indicating an active mode (ON) or inactive mode (OFF) of a decorrelation processing of the PCA type is determined by the block 300. The operation of the encoder depends on the mode in the current frame of index t (mode) and that of the preceding frame of index t−1 (prev_mode). With no loss of generality, it is assumed that, at startup of the encoder, the initial state of the preceding frame is prev_mode=OFF.

Figure 1:
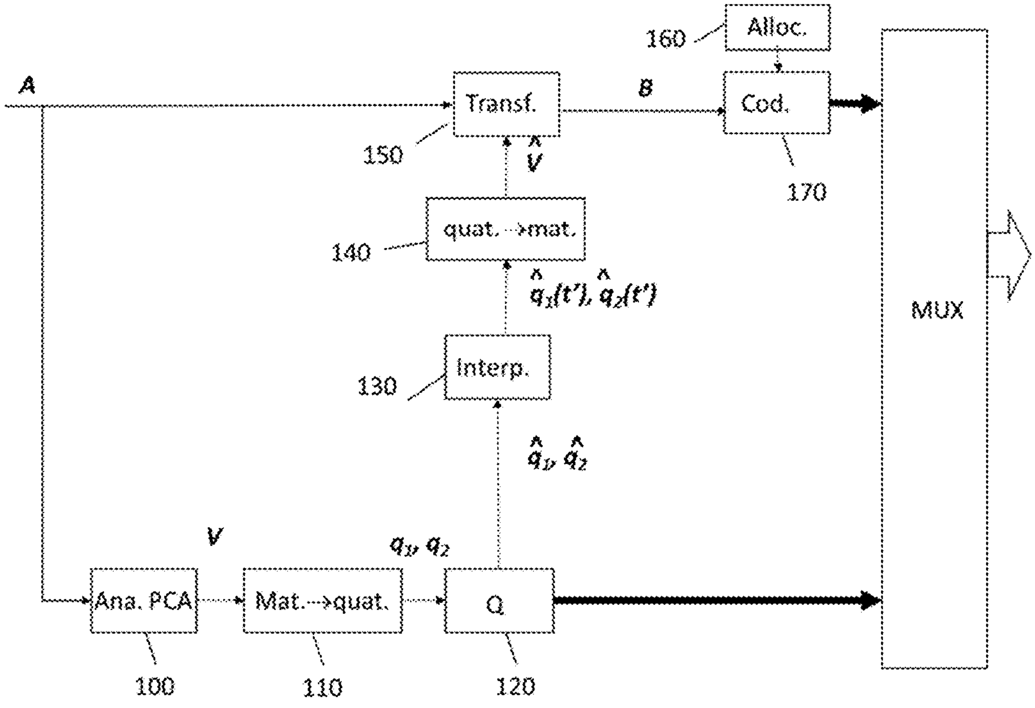
FIG.1 (prior art)
FIG. 1 illustrates one embodiment of an encoder and of an encoding method according to a method of the prior art.

The following 4 possible combinations may be distinguished:

- If mode=ON and prev_mode=ON, an operation identical to that in FIG. 1 is obtained, in other words the blocks 100, 110, 120, 320, 140, 150 and 170 in FIG. 3 respectively apply the same processing as the blocks 100, 110, 120, 130, 140, 150 and 170 described in FIG. 1. The branch 2 for which the input signal undergoes a transformation is selected by the block 330. In the allocation block 340, the fact that the encoding by PCA uses 1 bit to indicate the mode (ON) of the current frame, No bits for encoding the metadata and $R-1-N_Q$ bits for encoding the channels (block 170) is taken into account.
- If mode=OFF and prev_mode=OFF, the decorrelation by PCA is "short-circuited" and the branch 1 is selected by the selection block 330. The signal to be encoded B is identical to the input signal A. The allocation block 340 takes into account the fact that 1 bit is used to indicate the mode (OFF) of the current frame and R−1 bits for encoding the channels (block 170). By default, the eigenvalues $\hat{V}$ are fixed at the identity matrix and the encoded quaternions $\hat{q}_1$ and $\hat{q}_2$ at (1, 0, 0, 0) in the current frame—at the next frame, these values will be used to define the state of the preceding frame.
- If mode=OFF and prev_mode=ON, the eigenvalues $\hat{V}$ are fixed at the identity matrix and the encoded quaternions $\hat{q}_1$ and $\hat{q}_2$ at (1, 0, 0, 0), an interpolation is performed (block 320) between these values and the values of the preceding frame. The details of this interpolation are described hereinbelow. The selection module activates the branch 2, in which the input signals are transformed at 150 by a matrix coming from the interpolation carried out at 320. Here, it is not necessary to encode information on the transformation matrix of the current frame since the indication has a negative value for this current frame. The module for insertion of these coded data at 310 is therefore disconnected. The allocation block 340 takes into account the fact that 1 bit is used to indicate the mode of the current frame and R−1 bits for encoding the channels (block 170).
- If mode=ON and prev_mode=OFF, an interpolation is performed (block 320) between the current values of the coded quaternions $\hat{q}_1$ and $\hat{q}_2$ and the values (by default) at (1, 0, 0, 0) of the preceding frame. The details of this interpolation are described hereinbelow. The selection module activates the branch 2, in which the input signals are transformed at 150 by a matrix coming from the interpolation carried out at 320. The module for insertion of the coded transformation data of the current frame, at 310, here is connected since a PCA transformation and hence a decorrelation processing is indeed applied for this current frame. These data are coded over $N_Q$ bits. The allocation block 340 takes into account the fact that 1 bit is used to indicate the mode of the current frame and $R-1-N_Q$ bits for encoding the channels (block 170).

Following the processing of the preceding frame, the eigenvalues $\hat{V}$ and the coded quaternions $\hat{q}_1$ and $\hat{q}_2$ at the current frame t are stored in memory in order to define the new state of the preceding frame t−1 prior to processing the next frame. The decision on mode (mode) of the current frame t is also stored in memory in order to define the new state (prev_mode) of the preceding frame t−1 prior to processing the next frame.

The multiplexing module 350 thus inserts the coded data into the bit-stream according to the allocation defined at the block 340 and depending on the indication of activation determined for the current frame and for the preceding frame.

Embodiments of the interpolation (block 320) are now described. This block relies on the coded quaternions $\hat{q}_1$ (t) and $\hat{q}_2$ (t) at the current frame t and the coded quaternions $\hat{q}_1$ (t−1) and $\hat{q}_2$ (t−1) at the preceding frame t−1. The interpolation may be implemented according to the following pseudo-code where N sub-frames are used, for example N=40:

- Determination of the shortest path for the quaternions:
  - $d1 = \hat{q}_1(t-1) . \hat{q}_1(t)$
  - $d2 = \hat{q}_2(t-1) . \hat{q}_2(t)$
  - if d1<0 and d2<0 or (if d0<0 and if −d0>d1) or (if d1<0 and if −d1>d0):
  - $\hat{q}_1(t) \leftarrow -\hat{q}_1(t)$
  - $\hat{q}_2(t) \leftarrow -\hat{q}_2(t)$
- Interpolation by sub-frames of the quaternions over N sub-frames according to the NLERP (Normalized linear interpolation) method:
  - For t' = 0 to N−1:
  - $\alpha(t') = 1 - 0.5\ (1 - \cos(\pi\ (t' / N-1)))$
  - $\hat{q}_1(t') = \text{norm}\ (\alpha(t')^* \hat{q}_1(t-1) + (1 - \alpha(t'))\ \hat{q}_1(t))$
  - $\hat{q}_2(t') = \text{norm}\ (\alpha(t')^* \hat{q}_2(t-1) + (1 - \alpha(t'))\ \hat{q}_2(t))$ Where norm is the quaternion normalization operation (to the unity norm) which corresponds to a normalization on the unity sphere in 4 dimensions. In variants, the -continued

| |
|---|
| definition of α(t') could be modified, for example by taking α(t')= t' / (N−1). The use of the function 1−0.5 (1−cos(x)) here allows a slower interpolation at the ends. |

In variants, other interpolations of quaternions (e.g.: SLERP for Spherical linear interpolation or other) are possible. The NLERP method is used here because it is less complex and more stable for a limited digital precision.

Conversion of $\hat{q}_1$ (t') and $\hat{q}_2$ (t') into $\hat{V}$(t') (which corresponds to the block 140 and is known in the prior art)

Thus, this interpolation leads to constant values of piecewise matrixing with a regular division into N sub-frames.

In variants, other interpolation methods will be possible. For example, it will be possible to apply the interpolation sample by sample at the start of the frame (over the first N samples) then conserving a constant value $\hat{q}_1$ (t) and $\hat{q}_2$ (t) over the rest of the frame (i.e. L−N samples); in this case the index t' hereinabove corresponds to the index of the sample and the sub-frame comprises a single sample.

In variants other embodiments of the interpolation are possible with a different division into sub-frames.

Exemplary embodiments of the decision block 300 are now described.

In one exemplary embodiment, the determination of the indication of activation of the decorrelation processing uses several criteria with decisions by threshold:

1. Encoding gain of the PCA
2. Inter-frame distance between rotation matrices (which may be seen as a measurement of spatial stability)
3. Distance between the rotation matrix in the current frame and an identity matrix The motivations of the various criteria are respectively the following:

1. To ensure that the decorrelation by PCA provides a sufficient gain to justify its activation with respect to a direct encoding
2. To ensure that the interpolation between the rotation matrix in the current frame and that of the preceding frame does not result in very large variations of the matrixing over time
3. To ensure that the interpolation between the rotation matrix in the current frame and a potential disabling of the PCA does not lead to very large variations of the matrixing over time.

In one possible embodiment, another criterion may be based on the correlation matrix of the input signals, and on its values outside of the values of the diagonal. The correlation matrix is equivalent to the covariance matrix, except that the ambisonic components are respectively normalized by their standard deviation before calculating the intercorrelation. The criterion may thus be defined independently of the signal of the input signal, with a predetermined threshold applied for example to the maximum or average off-diagonal value (in absolute value) in the correlation matrix.

This allows it to be verified that there exists a minimum correlation between the input signals and that a decorrelation processing is useful.

Hereinbelow, exemplary embodiments of these decision criteria are given.

The definition of the encoding gain for a PCA/KLT transformation in the case of a Gaussian source with n channels is recalled here:

$$G_T = \frac{\frac{1}{n}\sum_{i=0}^{n-1}\sigma_i^2}{\sqrt[n]{\prod_{i=0}^{n-1}\sigma_i^2}}$$

This corresponds to the ratio between the arithmetic mean and the geometric mean of the variances (energies) of the components to be encoded (in the Gaussian case).

According to the invention, it is rather the ratio of the geometrical means between the energies $$C_{ii} = \sigma_i^2$$

of the input channels A in the numerator and the eigenvalues $\lambda_i$ in the denominator that is used. The gain expressed as a logarithmic value becomes:

$$G = \sum_{i=0}^{n-1}\log(\sigma_i^2 + \varepsilon) - \sum_{i=0}^{n-1}\log(\lambda_i + \varepsilon)$$

It is assumed that the eigenvalues are in decreasing order and positive. The term ε is for example fixed at $\varepsilon=10^{-8}$ for conditioning the calculation of the logarithm.

The gain G in fact corresponds to the sum (in the logarithmic domain) of the encoding (or decorrelation) gains between the individual (separate) channels taken before and after PCA.

In variants, the eigenvalues could also be normalized; in this case, the normalization factor is also applied to the energy values $$C_{ii} = \sigma_i^2.$$

One example of a criterion of distance between matrices is now defined. The preferred embodiment relies on the representation as a double quaternion, and the angular distance is determined by a scalar product between the quaternions at the current frame t and those of the preceding frame t−1:

$$P1 = q_1(t-1)\cdot q_1(t)$$

$$P2 = q_2(t-1)\cdot q_2(t)$$

The distance between the rotation matrices associated with the frames t and t−1 is evaluated as:

$$\min P = \min(P1, P2)$$

In a similar manner, the distance may be defined between the rotation matrix at the frame t and an identity matrix (represented by the unitary quaternions $q_1=q_2=(1, 0, 0, 0)$) such that:

$$(1,0,0,0)\cdot q_1(t) = a_1$$

$$(1,0,0,0)\cdot q_2(t) = a_2$$

$$\text{and } \min P2 = \min(a_1, a_2)$$

Thus, the decision (block 300) may be implemented in one example as follows:

when the indication of activation is by default positive, in other words such that mode=ON (active mode), the indication switches to negative mode such that mode=OFF (inactive mode) if the encoding gain G is lower than a predefined threshold, for example at 6, or if the inter-frame distance between rotation matrices is less than a threshold, for example 0.8, or else if the distance between the rotation matrix of the current frame and an identity matrix is less than a threshold, for example 0.

This then means:

$$\text{If } G < 6$$

$$\text{mode} = \text{OFF}$$

$$\text{If } \min P < 0.8$$

$$\text{mode} = \text{OFF}$$

$$\text{If } \min P2 < 0$$

$$\text{mode} = \text{OFF}$$

In variants, the values of the thresholds (respectively 6, 0.8, 0) may be different.

In variants, the indication of activation is by default negative, in other words such that mode=OFF, and the indication switches to positive mode such that mode=ON if all the criteria verify the conditions opposite to those defined hereinabove. This therefore amounts to simply inverting the decision logic for the same result.

In other variants, at least one of the three criteria defined according to the invention is used, the others might not be used or replaced by other criteria.

Variants of the decision criteria are now described.

In variants, other definitions of the criteria could be taken, for example the encoding gain could be:

$$G = \log\left(\sum_{i=0}^{n-1}\sigma_i^2 + \varepsilon\right) - \frac{1}{n}\sum_{i=0}^{n-1}\log(\lambda_i + \varepsilon) + \log\left(\frac{1}{n}\right)$$

where the constant term $$\log\left(\frac{1}{n}\right)$$

may be omitted, or $$G = \log\left(\sum_{i=0}^{n-1}\sigma_i^2 + \varepsilon\right) - \log\left(\sum_{i=0}^{n-1}\lambda_i + \varepsilon\right)$$

In variants, other measurements of distance between rotation matrices may be defined, for example a Fröbenius distance or another distance between the rotation matrices $\hat{V}(t)$ and $\hat{V}(t-1)$, such as the Fröbenius norm of $I-\hat{V}(t)\hat{V}(t-1)^T$ where I is the identity matrix of dimension n.

In the case of a criterion based on the correlation matrix of the input signals, the correlation matrix corresponds to the covariance matrix applied to normalized components of the signals A. Such a covariance matrix, such as described with reference to FIG. 1, is obtained for example as follows:

$C=A\cdot A^T$ to within a normalization factor (in the real case) or $C=\mathrm{Re}\,(A\cdot A^H)$ to within a normalization factor (in the complex case).

In particular, the diagonal elements of C are denoted in the form $C_{ii}$, which represent the energy $$\sigma_i^2$$

of the $i^{th}$ input channel.

The elements of the covariance matrix taken into account here are the terms $C_{ij}$, and $C_{ji}$ of the matrix with $i\neq j$. The maximum value of these terms is determined and compared with a threshold, for example of value 0.1. In the case where the value is greater than this threshold, then the mode of the current frame is determined as active, ON mode. In the opposite case, the mode is determined as inactive, OFF mode.

In variants, the decision block could make a decision "in closed-loop mode"; this amounts to applying a PCA processing for the blocks 100 to 150 in order to obtain an initial version of the transformed signal B prior to confirming that the decision mode in the current frame of index t is ON. In this case, the eigenvalues $\lambda_i$ may be replaced by the respective energies of the channels of the initial version B. If the decision is finally at OFF, the initial version of the transformed signal B must then be replaced.

In variants where the closed-loop mode decision is used, further activation decision criteria could be added, such as the detection of maximum absolute value in each individual channel before and after PCA (in A and B); if this absolute value (in the current frame) in one of the channels of B exceeds that of the corresponding channel in the input signal A the mode is set to OFF in the current frame.

Figure 4:
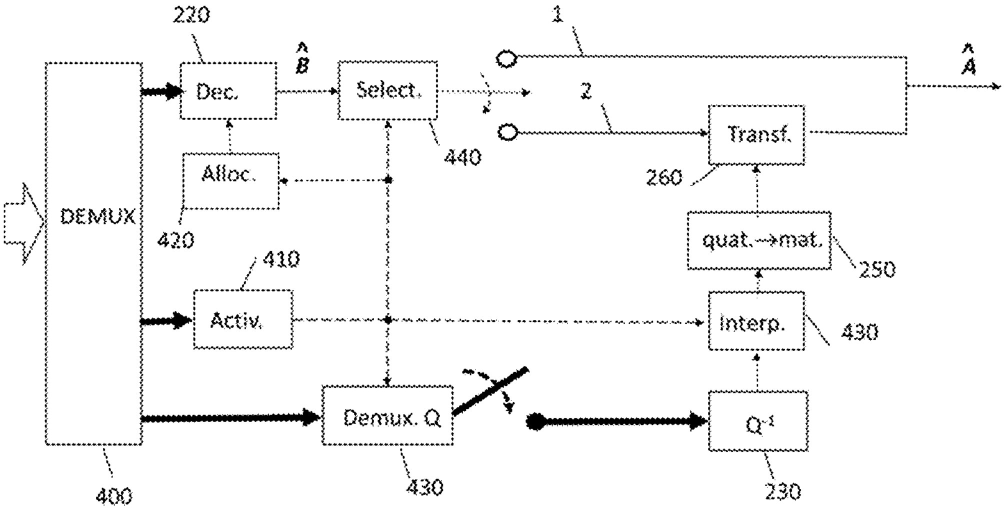
FIG. 4 illustrates one embodiment of a decoder and of a decoding method according to one embodiment of the invention.

FIG. 4 illustrates a decoder implementing the decoding method according to one embodiment of the invention.

The bit-stream is de-multiplexed at 400 and the decoder 220 receives the channels of the multichannel signal to be decoded according to a binary allocation determined at 420.

The module 410 receives the indication of activation of a decorrelation processing for the current frame and applies the decoding and transformation processing operations adapted to this indication, in the same manner as those carried out at the encoding.

Figure 2:
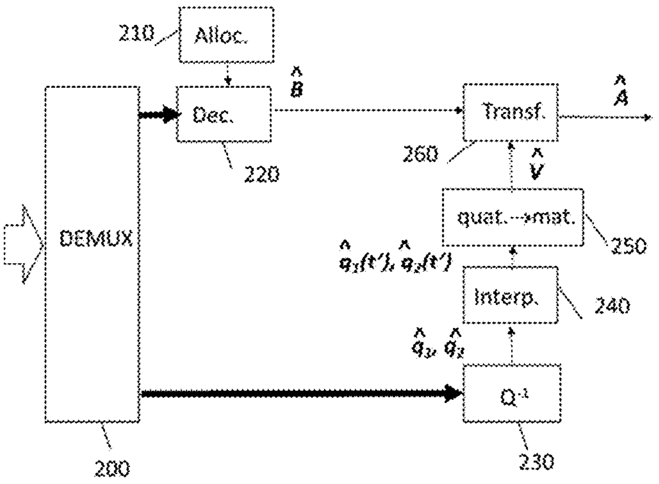
FIG.2 (prior art)
FIG. 2 illustrates one embodiment of a decoder and of a decoding method according to a method of the prior art.

Depending on the value of the indication of the preceding frame, the 4 following combinations are distinguished:

If mode=ON and prev_mode=ON, an operation identical to that in FIG. 2 is again obtained, in other words the blocks 220, 230, 430, 250 and 260 in FIG. 4 respectively apply the same processing operations as the blocks 220, 230, 240, 250 and 260 described in FIG. 2. The branch 2, for which the decoded signal undergoes a transformation by the block 260, is the selected by block 440.

The module for decoding the transformation information received in the bit-stream is implemented by the connection block 430. The allocation block 420 uses the $R-1-N_Q$ bits for decoding the channels at 220. By default, the eigenvalues $\hat{V}$ are fixed at the identity matrix and the coded quaternions $\hat{q}_1$ and $\hat{q}_2$ at (1, 0, 0, 0) in the current frame—at the next frame, these values will be used to define the state of the preceding frame.

If mode=OFF and prev_mode=OFF, the decorrelation by PCA is "short-circuited" and the branch 1 is selected by the selection block 440. The decoded signal $\hat{B}$ is identical to the decoded output signal $\hat{A}$. The allocation block 420 uses the R−1 bits for decoding the channels at 220.

If mode=OFF and prev_mode=ON, the eigenvalues $\hat{V}$ are fixed at the identity matrix and the coded quaternions $\hat{q}_1$ and $\hat{q}_2$ at (1, 0, 0, 0) in the current frame, an interpolation is carried (block 430) between these values and the values of the preceding frame, in an identical manner to the block 320. The selection module 440 activates the branch 2, in which the decoded signals are transformed at 260 by a matrix coming from the interpolation performed at 430. Here, it is not necessary to decode information on the transformation matrix of the current frame since the indication has a negative value for this current frame. The module for decoding these data is therefore disconnected by the block 430. The allocation block 420 uses the R−1 bits for decoding the channels at 220.

If mode=ON and prev_mode=OFF, an interpolation is carried out (block 430) between the current values of the coded quaternions and the values (by default) of the preceding frame in an identical manner to the block 320. The selection module 440 activates the branch 2, in which the decoded signals are transformed at 260 by a matrix coming from the interpolation performed at 430. The module for decoding 230 the coded transformation data for the current frame here is connected by the module 430, because a PCA transformation and hence a decorrelation processing operation is indeed applied for this current frame. The allocation block 420 uses the $R-1-N_Q$ bits for decoding the channels at 220.

It will be noted that the algorithmic delay linked to the encoding-decoding (blocks 170 and 220) must be compensated by storing the values of inverse matrixing V in memory for each sub-frame in the current frame as well as in the preceding frame. For example, when the encoding-decoding (blocks 170-220) is a multi-mono EVS encoding, there will typically be a delay of 12 ms to be compensated. If the interpolation uses N=40 sub-frames in a frame of 20 ms (i.e. sub-frames of 0.5 ms), it will therefore require a memory of 40+24=64 matrixing values (4×4 matrices) and the block 260 will apply the time-shifted matrixing of 24 sub-frames in the past.

After the processing of the preceding frame, the eigenvalues $\hat{V}$ and the coded quaternions $\hat{q}_1$ and $\hat{q}_2$ at the current frame t are stored in memory in order to define the new state of the preceding frame t−1 prior to processing the next frame. The decision on mode (mode) of the current frame t is also stored in memory in order to define the new state (prev_mode) of the preceding frame t−1 prior to processing the next frame.

Figure 5:
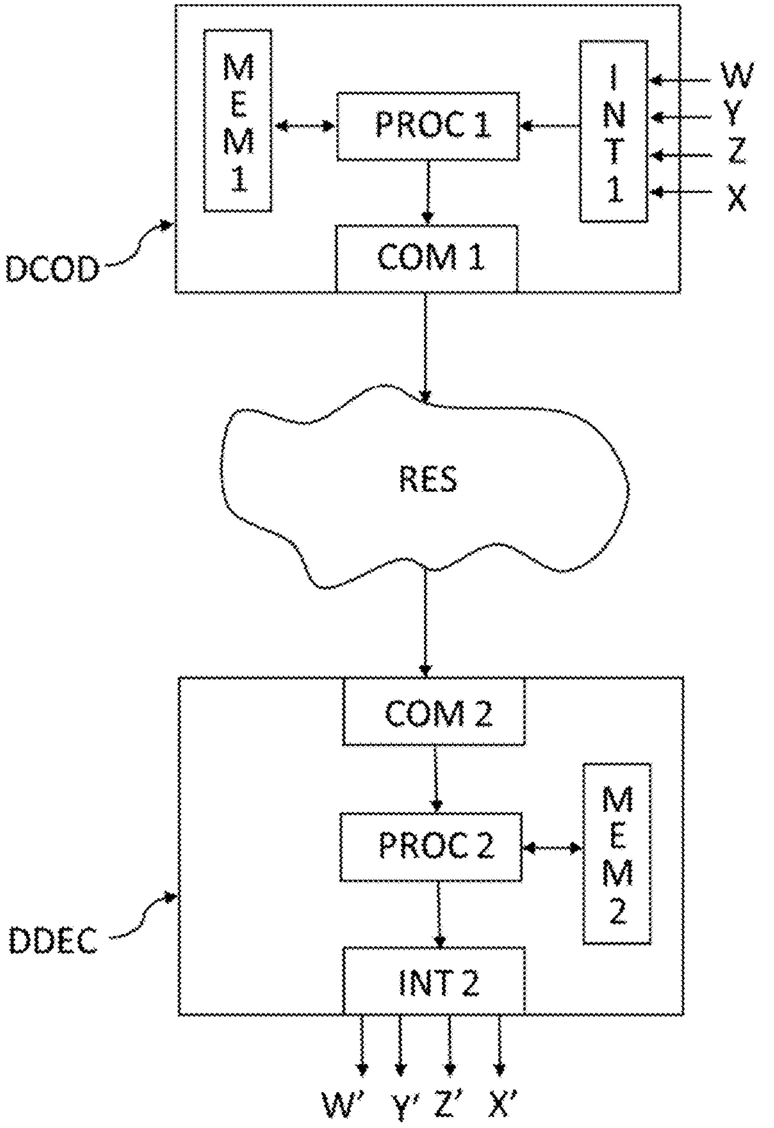
FIG. 5 illustrates examples of structural embodiments of an encoder and of a decoder in the sense of the invention.

FIG. 5 illustrates an encoding device DCOD and a decoding device DDEC, in the sense of the invention, these devices being dual with each other (in the sense of "reversible") and connected together via a communications network RES.

The encoding device DCOD comprises a processing circuit typically including:

a memory MEM1 for storing data of instructions for a computer program in the sense of the invention (where these instructions may be distributed between the encoder DCOD and the decoder DDEC);

an interface INT1 for receiving ambisonic signals distributed over various channels (for example four channels W, Y, Z, X at the first order) with a view to their compression encoding in the sense of the invention;

a processor PROC1 for receiving these signals and processing them by executing the computer program instructions stored in the memory MEM1, with a view to their encoding; and a communications interface COM 1 for transmitting the encoded signals via the network.

The decoding device DDEC comprises its own processing circuit, typically including:

a memory MEM2 for storing data of instructions for a computer program in the sense of the invention (where these instructions may be distributed between the encoder DCOD and the decoder DDEC, as previously indicated);

an interface COM2 for receiving the encoded signals from the network RES with a view to their compression decoding in the sense of the invention;

a processor PROC2 for processing these signals by executing the computer program instructions stored in the memory MEM2, with a view to their decoding; and an output interface INT2 for delivering the decoded signals in the form of ambisonic channels W', Y', Z', X', for example with a view to their reproduction.

It goes without saying that this FIG. 5 illustrates one example of a structural embodiment of a codec (coder or decoder) in the sense of the invention. FIGS. 3 to 4 describe in detail more functional embodiments of these codecs.

Although the present disclosure has been described with reference to one or more examples, workers skilled in the art will recognize that changes may be made in form and detail without departing from the scope of the disclosure and/or the appended claims.

The invention claimed is:

1. A method implemented by an encoding device for encoding audio signals forming a succession of frames of samples over time, in each of n channels as an ambisonic representation of order higher than 0, the method comprising:

determining, for the current frame to be encoded, a binary value indicating an active mode or inactive mode of a decorrelation processing to be applied to the signals of the current frame and encode this value into the bit-stream;

in the case where the mode is determined as active, encoding decorrelation processing information into the bit-stream; and generating an output signal to be encoded into the bit-stream, according to the mode determined for the current frame and that of a frame preceding the current frame.

2. The method as claimed in claim 1, in which the determination of the binary value indicating an active or inactive mode is carried out according to at least one gain criterion for encoding signals before and after decorrelation processing.

3. The method as claimed in claim 2, in which a gain of the encoding is defined by the following logarithmic value:

$$G=\sum_{i=0}^{n-1}\log(\sigma_i^2+\varepsilon)-\sum_{i=0}^{n-1}\log(\lambda_i+\varepsilon)$$

with $$\sigma_i^2$$

being energies of input channels of the decorrelation processing and $\lambda_i$ being eigenvalues of the input channels, the mode being determined as inactive for a predefined value of the gain G.

4. The method as claimed in claim 1, in which the determination of the binary value indicating an active or inactive mode is carried out according to a criterion of inter-frame distance between rotation matrices applying the decorrelation processing.

5. The method as claimed in claim 4, in which the rotation matrices are represented as double quaternions, an inter-frame distance between the rotation matrices being expressed using a scalar product between the quaternions at the current frame and those of the preceding frame.

6. The method as claimed in claim 1, in which the determination of the binary value indicating an active or inactive mode is carried out according to a distance criterion between a rotation matrix, applying the decorrelation processing, of the current frame and an identity matrix.

7. The method as claimed in claim 6, in which rotation matrices are represented as double quaternions, the distance between the rotation matrix of the current frame and the identity matrix being expressed in the form of a scalar product between the quaternions at the current frame and unitary quaternions.

8. A method implemented by a decoding device for decoding audio signals forming a succession of frames of samples over time, in each of n channels as an ambisonic representation of order higher than 0, the method comprising:

receiving, for a current frame, in addition to the signals of the n channels of this current frame, a binary value indicating an active mode or inactive mode of a decorrelation processing applied to the signals of the current frame;

in the case where the mode is determined as active, decoding decorrelation processing information received in the bit-stream; and generating an output signal, as a function of said mode determined for the current frame and that of a frame preceding the current frame.

9. An encoding device for encoding audio signals forming a succession of frames of samples over time, in each of n channels as an ambisonic representation of order higher than 0, the encoding device comprising:

a processing circuit configured to:

determine, for the current frame to be encoded, a binary value indicating an active mode or inactive mode of a decorrelation processing to be applied to the signals of the current frame and encode this value into the bit-stream;

in the case where the mode is determined as active, encode decorrelation processing information into the bit-stream; and generate an output signal to be encoded into the bit-stream, according to the mode determined for the current frame and that of a frame preceding the current frame.

10. A decoding device for decoding audio signals forming a succession of frames of samples over time, in each of n channels as an ambisonic representation of order higher than 0, the decoding device comprising:

a processing circuit configured to:

receive, for a current frame, in addition to the signals of the n channels of this current frame, a binary value indicating an active mode or inactive mode of a decorrelation processing applied to the signals of the current frame;

in the case where the mode is determined as active, decode decorrelation processing information received in the bit-stream; and generate an output signal, as a function of said mode determined for the current frame and that of a frame preceding the current frame.

11. A non-transitory computer readable storage medium storing a computer program in memory comprising instructions for executing the encoding method according to claim 1 when the instructions are executed by a processor of the encoding device.

12. A non-transitory computer readable storage medium storing a computer program in memory comprising instructions for executing the decoding method according to claim 8 when the instructions are executed by a processor of the decoding device.

* * * * *